(12) United States Patent
Myung

(10) Patent No.: US 10,432,502 B2
(45) Date of Patent: Oct. 1, 2019

(54) METHOD AND APPARATUS FOR OVERLAP-RESISTANT DYNAMIC ROUTING

(71) Applicant: ELECTRONICS AND TELECOMMUNICATIONS RESEARCH INSTITUTE, Daejeon (KR)

(72) Inventor: Jung Ho Myung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/818,912

(22) Filed: Nov. 21, 2017

(65) Prior Publication Data

US 2018/0212864 A1 Jul. 26, 2018

(30) Foreign Application Priority Data

Jan. 24, 2017 (KR) .................. 10-2017-0010820

(51) Int. Cl.
| | |
|---|---|
| *H04L 12/721* | (2013.01) |
| *H04L 12/707* | (2013.01) |
| *H04L 12/801* | (2013.01) |
| *H04L 12/735* | (2013.01) |
| *H04L 12/715* | (2013.01) |

(52) U.S. Cl.
CPC ............ *H04L 45/12* (2013.01); *H04L 45/24* (2013.01); *H04L 47/12* (2013.01); *H04L 45/128* (2013.01); *H04L 45/64* (2013.01)

(58) Field of Classification Search
CPC ......... H04L 45/12; H04L 45/24; H04L 47/12; H04L 45/128; H04L 45/64
See application file for complete search history.

(56) References Cited

U.S. PATENT DOCUMENTS

| 9,507,625 B2 | 11/2016 | Lee et al. | |
|---|---|---|---|
| 2004/0264555 A1* | 12/2004 | Hegde | H03M 13/39 375/148 |
| 2014/0362705 A1* | 12/2014 | Pan | H04L 47/125 370/237 |
| 2016/0134527 A1 | 5/2016 | Kwak et al. | |

FOREIGN PATENT DOCUMENTS

| KR | 10-2015-0002474 A | 1/2015 |
|---|---|---|
| KR | 10-1668426 B1 | 10/2016 |

OTHER PUBLICATIONS

Qi Duan et al., "Efficient Random Route Mutation Considering Flow and Network Constraints", 2013 IEEE Conference on Communications and Network Security (CNS), pp. 260-268, Oct. 14-16, 2013.

\* cited by examiner

*Primary Examiner* — Dady Chery
(74) *Attorney, Agent, or Firm* — Rabin & Berdo, P.C.

(57) ABSTRACT

A disclosure of the present invention is related to a method and an apparatus for overlap-resistant dynamic routing to prevent a path from overlapping. A method of performing an overlap-resistant routing according to an embodiment of the present disclosure includes: computing p candidate paths (p is an integer more than 2) from a first host to a second host based on information related to a network structure; computing k paths (k is an integer more than 1, k≤P) with low redundancy from the p candidate paths; and setting one path from the k paths according to a path change timing.

18 Claims, 9 Drawing Sheets

FIG.4A

Path 1:  0→1→3→9→11→12
---
Path 2:  0→1→4→8→10→12

Path 3:  0→2→4→9→11→12

Path 4:  0→2→4→9→11→12
---
Check :   1   0   0   2   2

FIG.4B

```
        Check :    1   0   0   2   2
   x Weighting:    2   4   6   4   2
   ------------------------------------
                   2   0   0   8   4
                                   +
   ------------------------------------
Total Overlap value=                14
```

FIG.4C

```
Path 2:  0→1→4→8→10→12
------------------------
Path 1:  0→1→3→9→11→12

Path 3:  0→2→4→9→11→12

Path 4:  0→2→4→9→11→12
------------------------
Check :     1   0   0   0   0

X weighting :  2   4   6   4   2
------------------------
                                2
```

METHOD AND APPARATUS FOR OVERLAP-RESISTANT DYNAMIC ROUTING

CROSS REFERENCE TO RELATED APPLICATION

The present application claims priority to Korean Patent Application No. 10-2017-0010820, filed Jan. 24, 2017, the entire contents of which is incorporated herein for all purposes by this reference.

BACKGROUND OF THE INVENTION

Field of the Invention

The present invention relates generally to dynamic routing and, more particularly, to a method and an apparatus for overlap-resistant dynamic routing to prevent a path from overlapping.

Description of the Related Art

A routing applied to a network including a hardware device such as an Internet Protocol (IP) based router, a switch, and a gateway is presently a method of finding the shortest path first. In such a network, the blocks constituting the path (i.e., routers, switches, gateways, etc.) have fixed characteristics, and the shortest paths on these blocks have very static characteristics. That is, although the shortest path routing scheme has low configuration complexity and can support good communication performance, it can have a disadvantage of being vulnerable to network attacks due to the fixed characteristics.

In order to solve these problems, various studies on dynamic routing have been carried out. In particular, research on dynamic routing in a software defined network (SDN), which is out of an existing hardware-based network, is actively being conducted.

However, since the dynamic routing method currently being studied follows a predetermined optimization algorithm, many path overlaps may occur. In other words, even if the dynamic routing is applied, it does not solve the problem of being vulnerable to network attacks.

Therefore, a dynamic routing scheme that is robust against network attacks by preventing or minimizing the redundancy of routes is required, but no specific scheme therefor has been provided.

SUMMARY OF THE INVENTION

It is a technical object of the present invention to provide a method and an apparatus for generating a plurality of candidate paths for the purpose of overlap-resistant dynamic routing.

It is another object of the present disclosure to provide a method and an apparatus for computing one or more paths from a plurality of candidate paths for the purpose of overlap-resistant dynamic routing.

It is yet another technical object of the present disclosure to provide a method and an apparatus for setting a path from one or more paths computed from a plurality of candidate paths for the purpose of overlap-resistant dynamic routing.

The technical objects to be achieved by the present disclosure are not limited to the technical matters mentioned above, and other technical objects not mentioned are to be clearly understood by those skilled in the art from the following description.

In order to accomplish the above object, the present invention provides a method of performing an overlap-resistant routing, the method includes steps of computing p candidate paths (p is an integer of 2 or more) from a first host to a second host based on information related to a network structure; computing k paths (k is an integer of 1 or more, k≤P) with low redundancy from the p candidate paths; and setting one path from the k paths according to a path change timing.

According to another aspect of the present invention, the present invention provide an apparatus for performing an overlap-resistant routing including: a candidate path computing unit for computing p candidate paths (p is an integer of 2 or more) from a first host to a second host based on information related to a network structure; a path computing unit for computing k paths (k is an integer of 1 or more, k≤P) with low redundancy from the p candidate paths; and a path setting unit for setting one path from the k paths according to a path change timing.

According to various aspects, the k paths with low redundancy may be determined from the p candidate paths by comparing accumulative values of overlap counts of links or blocks.

According to various aspects, the k paths with low redundancy may be determined from the p candidate paths by comparing accumulative values of values obtained by applying weights to overlap counts of links or blocks.

According to various aspects, each of the p candidate paths may be computed as a shortest path for each of cases where different parameter values for the network structure are assumed.

According to various aspects, a first path may be selected from the k paths at a first point of time of the path change timing, and a second path may be selected from the k paths at a second point of time of the path change timing.

According to various aspects, the one path may be determined randomly from the k paths.

According to various aspects, the setting of the one path from the k paths includes a step of sending a path setting message in response to a path setting request from the first host to the second host.

According to various aspects, the path setting message may be transmitted to one or more switches belonging to the one path.

According to various aspects, the information related to the network structure may include a connection type of blocks constituting a network and parameters related to traffic transfer.

According to various aspects, the parameters related to the traffic transfer may include one or more of a number of hops, a link delay cost, an available bandwidth ratio (ABR), a bandwidth, a quality of service (QoS), and a delay.

The features briefly summarized above for this disclosure are only exemplary aspects of the detailed description of the disclosure described below, and are not intended to limit the scope of the disclosure.

According to the present disclosure, a method and an apparatus for supporting overlap-resistant dynamic routing can be provided by computing a plurality of candidate paths.

According to the present disclosure, a method and an apparatus for supporting overlap-resistant dynamic routing can be provided by computing one or more paths from a plurality of candidate paths.

According to the present disclosure, a method and apparatus for supporting overlap-resistant dynamic routing can be provided by setting one path from one or more paths computed from a plurality of candidate paths.

The effects obtainable in the present disclosure are not limited to the effects mentioned above, and other effects not mentioned can be clearly understood by those skilled in the art from the description described below.

BRIEF DESCRIPTION OF THE DRAWINGS

The above and other objects, features and other advantages of the present invention will be more clearly understood from the following detailed description when taken in conjunction with the accompanying drawings, in which:

FIGS. 4A to 4C are diagrams for explaining an example of an overlap check according to the present disclosure;

DESCRIPTION OF THE REFERENCE NUMERALS IN THE DRAWINGS

Figure 1:
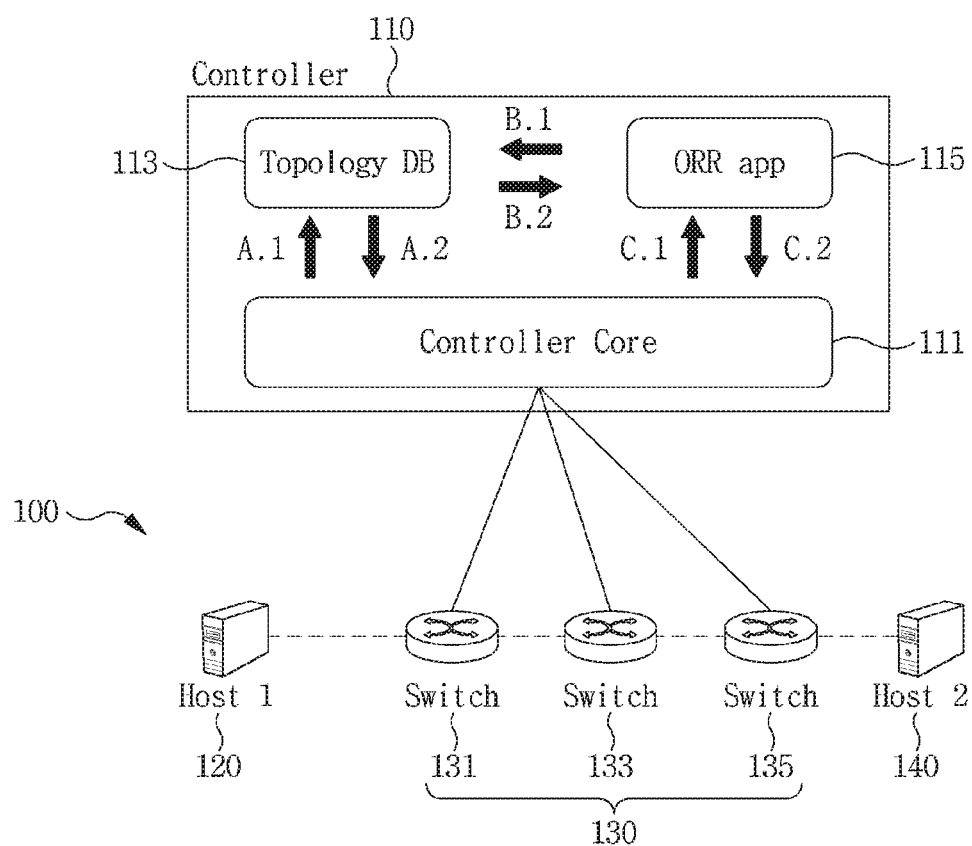
FIG. 1 is a diagram illustrating an exemplary model of a network architecture that supports overlap-resistant dynamic routing according to the present disclosure.

| | |
|---|---|
| 100: network | 110: controller |
| 111: controller core | 113: topology DB |
| 115: ORR application | 120: first host |
| 130: switch | 131: first switch |
| 133: second switch | 135: third switch |
| 140: second host | |
| 600: redundant-protection routing device | |
| 610: candidate path computing unit | |
| 620: path computing unit | 630: path setting unit |

DETAILED DESCRIPTION OF THE INVENTION

Hereinbelow, embodiments of the present invention will be described in detail so that those skilled in the art can easily carry out the present invention referring to the accompanying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "connected" to another element, it is understood to include not only a direct connection relationship but also an indirect connection relationship. Also, when an element is referred to as "containing" or "having" another element, it means not only excluding another element but also further including another element.

In the present disclosure, the terms "first", "second", and so on are used only for the purpose of distinguishing one element from another, and do not limit the order or importance of the elements unless specifically mentioned. Thus, within the scope of this disclosure, the first component in one embodiment may be referred to as a second component in another embodiment, and similarly a second component in one embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in one embodiment are also included within the scope of this disclosure. Also, embodiments that include other components in addition to the components described in the various embodiments are also included in the scope of the present disclosure.

The definitions of the terms used in this disclosure are as follows:

Controller centralized network structure: A network structure in which roles are clearly distinguished as a control unit and a transmission unit, for example, a software defined network (SDN) that includes a controller and a switch.

Controller: A block, defined in a control plane, which is responsible for managing a network, switches, flows, and controlling a major operation such as path setting.

Switch: A block, defined in a data plane that receives data from another block and sends it to another block.

Path: An order of blocks to which data are transmitted in a network, or a unit corresponding to a set of blocks.

Host: A block that is the subject of data transmission or reception. It may be both endpoints of communication over a network.

Block: Collectively referred to as a unit that may be configured as a physical node or as a software-implemented application.

Topology: A concept that refers overall to a connection type of blocks that constitute a network (for example, the network structure that can be represented by a graph) and parameters related to traffic transfer.

The definitions of the foregoing terms are merely illustrative, and the scope of the present disclosure is not limited by these definitions. For example, the definition of such terms does not exclude the basic meaning that is easily understood by those skilled in the art.

In the following, various examples of this disclosure for a dynamic routing scheme that prevent a path from overlapping are described. According to these examples of this disclosure, a method and an apparatus can prevent eavesdropping for the network packets and defend against network attacks (e.g., Denial of Service (DoS) attacks).

The routing setting method applied to most of existing switches uses a method of finding and applying a shortest path. The above method has a merit that it is simple and has good performance with low complexity, whereas it has a big disadvantage in that it is vulnerable to eavesdropping and DoS attacks because the set path is static. Specifically, the existing routing is difficult to change because it is set up according to rules (e.g., a routing algorithm stored in a firmware of a hardware switch) that are difficult to change in each hardware switch (or router). In particular, it is more difficult to change such path setting rules dynamically.

To solve this problem, various techniques are being studied to support dynamic routing while raising the complexity of path computation and setting. This research is being studied more actively in software defined networking (SDN) systems, and a reason thereof can be found through a structure of SDN. The SDN has a structure in which roles are clearly distinguished as a SDN-controller and the SDN-switch, and all instructions on the path setting are performed by the SDN-controller. That is, all of the information about network topologies is centralized to the SDN-controller, and the SDN-switch follows the switching rule determined by the SDN-controller, so that the path setting and change can be processed smoothly. Due to a high degree of freedom of the path setting, dynamic routing techniques for SDN systems are being actively studied.

Existing dynamic routing schemes perform optimization by reflecting the number of hops or network conditions (e.g., link cost). In general, assuming that both endpoints of communication are set unchanged (that is, between the same endpoints), the number of hops of the network and the network conditions between both endpoints do not change dynamically, whereby there is a high probability that the results are the same path even if the paths are computed according to the dynamic path setting technique. Therefore, even in a system where the dynamic path setting is supported, the path set between specific end points often maintains unchanged, and it is insufficient to solve the problem of being vulnerable to eavesdropping and DoS attacks.

In order to solve such a problem, the present disclosure describes an overlap-resistant dynamic routing scheme that effectively reduces the redundancy between paths dynamically computed, and is effective in preventing the eavesdropping and defending against DoS attacks.

FIG. 1 is a diagram illustrating an exemplary model of a network architecture that supports overlap-resistant dynamic routing in accordance with the present disclosure.

The network 100 may include a controller 110, a first host 120, a switch 130, and a second host 140.

The controller 110 is a block responsible for managing a network, switches, and flows, and for controlling a major operation such as path setting.

The controller 110 may include a controller core 111, a topology database 113, and an overlap-resistant routing application (ORR app) 115.

The controller core 111 is a block containing the essential functions of the controller.

The topology database (DB) 113 is a database for managing information on a network topology. The network topology may refer to a connection type of blocks constituting the network and parameters related to a traffic transfer. Here, the parameters related to the traffic transfer include parameters reflecting properties and conditions of the network, such as link characteristics, a bandwidth, a QoS (quality of service), a delay and so on of the traffic. The parameters related to the traffic transfer may vary with time.

The topology DB 113 may be included in the controller 110 or may be configured to exchange information with the controller 110 from the outside.

The ORR application 115 corresponds to a functional block for setting the overlap-resistant routing path.

Referring to A.1 of FIG. 1, the controller core 111 may transfer information (e.g., link disconnection, traffic information, etc.) that is changed in the network controlled by the controller, to the topology DB 113.

Referring to A.2 of FIG. 1, the topology DB 113 may update the topology information in the database using the information received in A.1, and transmit a response message (or a confirmation message) for notifying the controller core 111 of an update schedule or an update completion.

Referring to B.1 of FIG. 1, the ORR application 115 may request the topology DB 113 for topology information in order to set the overlap-resistant routing path.

Referring to B.2 of FIG. 1, the topology DB 113 may communicate a response message containing the topology information to the ORR application 115, in a response to the request at B.1.

Referring to C.1 of FIG. 1, the controller core 111 may request the ORR application 115 to compute the path.

Referring to C.2 of FIG. 1, the ORR application 115 may compute the path and communicate a response message including the results to the controller core 111.

Hereinafter, specific examples of this disclosure for path computation in the ORR application 115 are described below.

Figure 2:
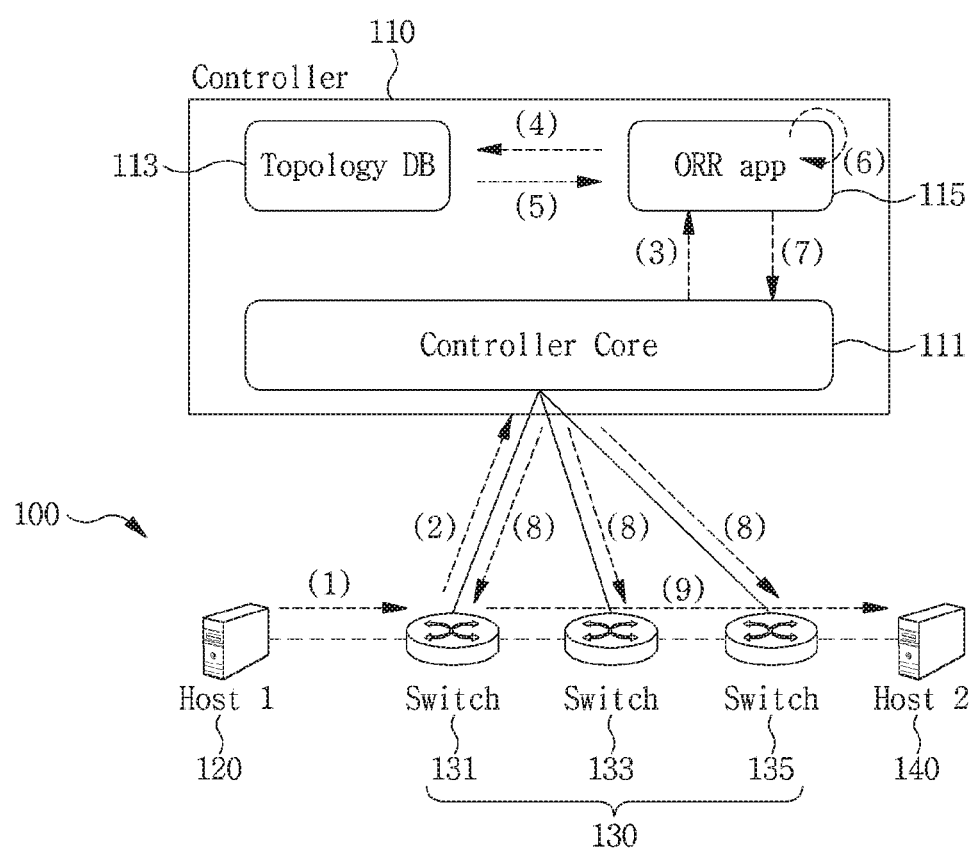
FIG. 2 is a diagram for explaining a path setting process for overlap-resistant dynamic routing according to the present disclosure.

FIG. 2 is a diagram for explaining a path setting process for the overlap-resistant dynamic routing according to the present disclosure.

In the example of FIG. 2, it is assumed that data is transmitted from the first host 120 to the second host 140.

Referring to (1) in FIG. 2, the first host 120 may transmit a packet to a first switch 131 to transmit data to the second host 140.

Referring to (2) in FIG. 2, since the first switch 131 does not have information or settings on a path for the packet to be transferred, the first switch 131 may request the controller 110 to set the path.

Referring to (3) in FIG. 2, the controller core 111 may request the ORR application 115 to compute the path, in order to determine the path to transfer the packet.

Referring to (4) in FIG. 2, the ORR application 115 may request the topology DB 113 for information (for example, topology information) needed to compute the path.

Referring to (5) in FIG. 2, the topology DB 113 may transmit the topology information to the ORR application 115.

Referring to (6) in FIG. 2, the ORR application 115 may compute more than one path where the packet is transferred from the first host 120 to the second host 140 based on the information including the topology information received in the topology DB 113.

Referring to (7) in FIG. 2, the ORR application 115 may communicate the computation result (i.e., information about more than one path) to the controller core 111.

Referring to (8) in FIG. 2, the controller core 111 may transmit instructions or information on the path setting to more than one switch included in the more than one path (for example, the first switch 131, the second switch 133, the third switch 135).

Referring to (9) in FIG. 2, a packet may be transferred to the second host 140 through one of the set paths.

Although FIG. 2 shows an example in which the first switch 131, the second switch 133, and the third switch 135 are included in one path, the instruction or information on the path setting of (8) in FIG. 2 may also be communicated to another switch(es) not shown in FIG. 2 and the packet may be transferred from the first host 120 to the second host 140, if necessary, by switching to another path including the other switch(s).

Figure 3A:
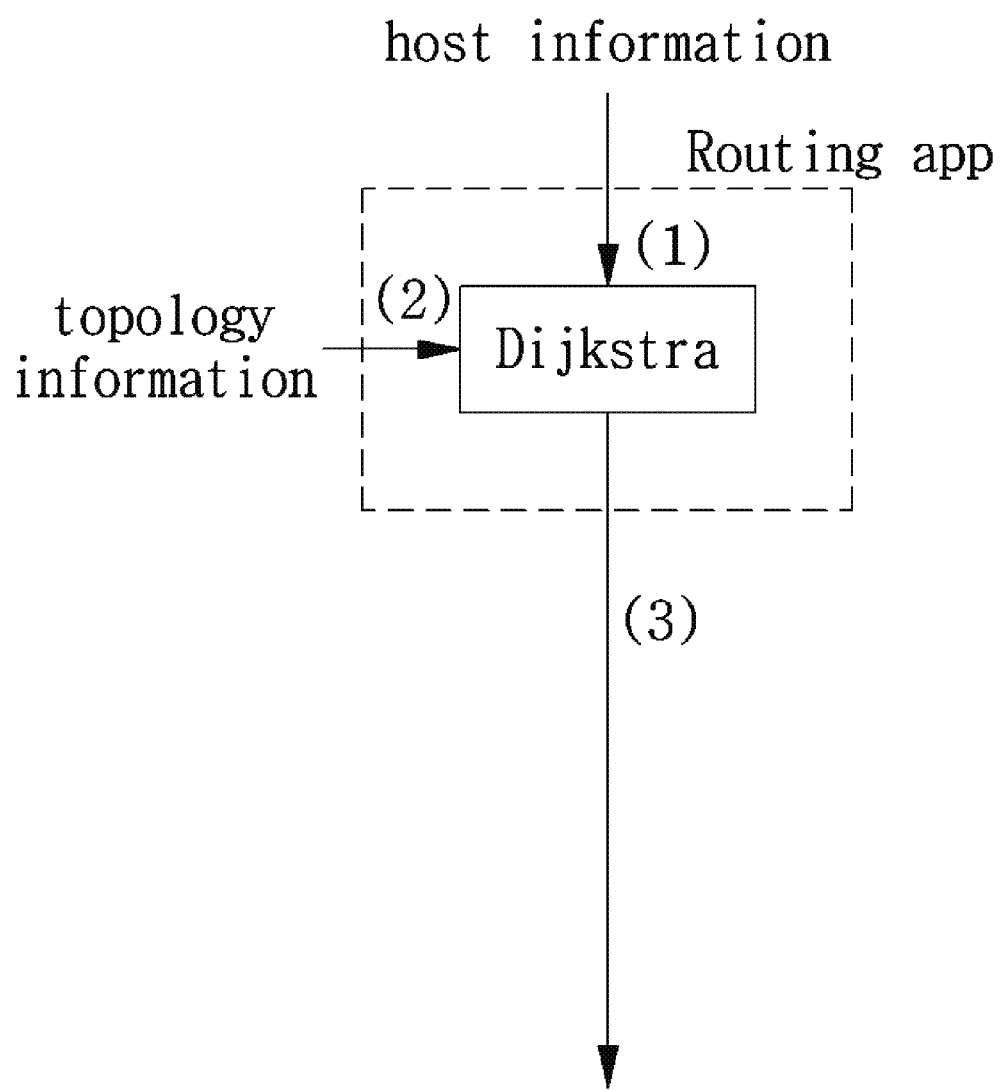
FIGS. 3A and 3B are diagrams for explaining an exemplary configuration of ORR (overlap-resistant dynamic routing) application according to the present disclosure.
Figure 3B:
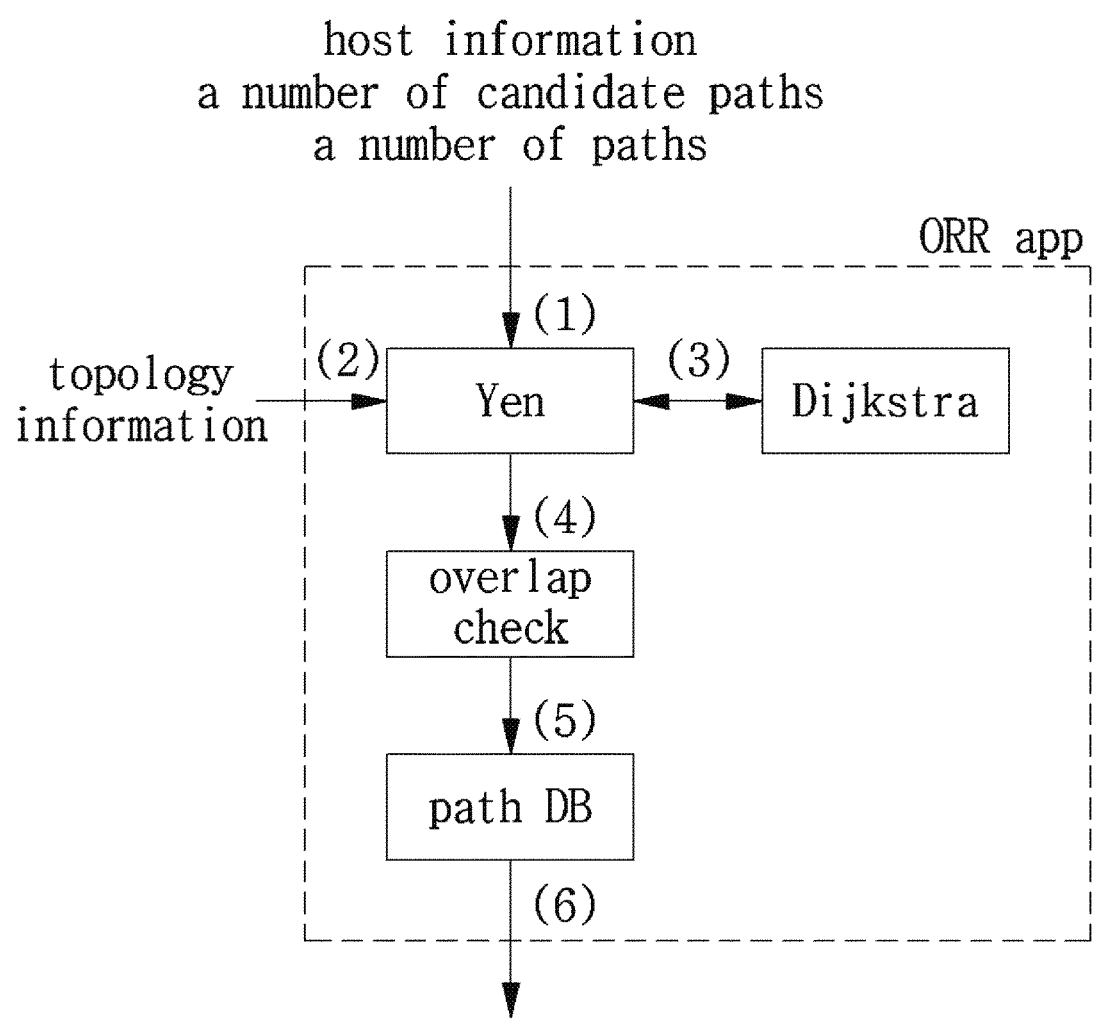

FIGS. 3A and 3B are diagrams for explaining an exemplary configuration of the ORR application according to the present disclosure.

FIG. 3A shows an exemplary configuration of a conventional routing application. FIG. 3A shows, as a representative example, that the routing application computes the path based on a Dijkstra algorithm.

Referring to (1) of FIG. 3A, the routing application can receive host information (i.e., information about both end points of data transfer) included in the path computation request from the controller core 111. The host information may include, for example, a source IP and a destination IP.

Referring to (2) of FIG. 3A, the routing application can obtain the topology information from the topology DB 113.

Referring to (3) of FIG. 3A, the routing application computes the shortest path according to the Dijkstra algorithm based on the information obtained in (1) and (2) and transmits the result to the controller core 111. Here, the shortest path between both end points may be one path.

Since the conventional routing technique shown in FIG. 3A computes one shortest path that meets the requirements of the user (for example, minimizing delay, maximizing throughput, and the like), the path computation is not complicated and thus the computation time is short. However, since it uses a single path, there is a problem that it can be easily exposed to and eavesdropped by an attacker who knows information on the network configuration. In addition, there are problems of low reliability and low resilience because it is difficult to switch to another path even in a situation where the path is not available due to a DoS attack.

In order to solve the problem of such single path based-routing, one example of the present disclosure can apply a dynamic routing scheme that computes and uses a plurality of path candidates. Here, the plurality of path candidates may be paths whose redundancy is minimized (i.e., paths that are prevented from overlapping).

FIG. 3B shows an exemplary configuration of the ORR application 115 according to the present disclosure.

Referring to (1) of FIG. 3B, the ORR application includes host information (i.e., information about both end points of data transfer) included in the path computation request from the controller core 111, information on the number of candidate paths, and information on the number of paths. The host information may include, for example, a source IP and a destination IP.

The number of candidate paths is p (p is an integer of 2 or more), and the number of paths is k (k is an integer of 1 or more). Herein, k≤P. Further, the values of p and k may be set as system parameters, or may be set or changed dynamically. For example, one or more of p and k may be set by a user's request or set in an event-triggered manner (e.g., set to a particular value when an event occurs in which network traffic increases above a predetermined threshold).

Referring to (2) of FIG. 3B, the ORR application 115 can obtain the topology information from the topology DB 113.

The Yen block of FIG. 3B illustrates applying an exemplary algorithm to determine path candidates for candidates of various network structures. The scope of the present disclosure is not limited to the Yen algorithm, but various other algorithms for determining a plurality of candidate paths may be applied.

Referring to (3) of FIG. 3B, in the Yen block, a plurality of candidate paths can be computed by changing the network structure. That is, in the Yen block, a plurality of candidate paths can be computed by applying various hypotheses on the network structure. In other words, the Yen block can compute a plurality of candidate paths by assuming different parameter values for the network topology.

For example, a shortest path on the first network structure may be acquired by requesting a Dijkstra block, and a shortest path on the second network structure may be obtained by requesting the Dijkstra block. In addition, this process can be repeated for a plurality of network structures to compute a plurality of (for example, p) candidate paths.

For example, the p shortest paths (i.e., p candidate paths) may be computed based on parameters (e.g., one or more of the number of hops, link delay cost, available bandwidth ratio (ABR)) reflecting link characteristics between the switches.

Here, the number of hops may correspond to the number of intermediate switches through which data has passed when transmitting data from the first host 120 to the second host 140.

The link delay cost may correspond to the time required to transmit the packet from one switch to the other switch.

The ABR may be determined based on a reference bandwidth, an interface bandwidth, and a used bandwidth. Specifically, it can be defined as ABR=reference bandwidth/ (interface bandwidth-used bandwidth). For example, assuming that a value of a reference bandwidth used in the entire network is 10 GHz and the interface bandwidth between one switch and the other switch is 100 GHz, if the traffic is transferred at the bandwidth of 50 GHz, ABR equals 100/(100−50)=2.

If the candidate path is computed based on various parameters, the priority of the parameter application may conform to an order predefined in the system, or may be set by a user or an operator.

Referring to (4) of FIG. 3B, the p candidate paths computed in the Yen block may be transferred to an overlap check block. It is possible to perform an overlap check among p candidate paths in the overlap check block. The overlap check can be determined based on whether the block (or switch) is overlapped, whether the link is overlapped, or the like. In the overlap check block, k paths can be determined in order of paths having low redundancy among p candidate paths.

Referring to (5) of FIG. 3B, the overlap check block can be transmitted to a path DB for k paths.

Referring to (6) of FIG. 3B, the path DB may transmit information on k paths to the controller core 111.

For example, the path DB may transmit one of k paths to the controller core 111 according to the path change timing. That is, one path out of k paths can be set for every path change timings.

That is, the first path is selected from the k paths at a first point of time of the path change timing, and the second path different from the first path may be selected from the k paths at the second point of time. In this way, a path that has not been selected previously from the k paths can be selected for each path change timing.

Also, one of the k paths may be selected randomly. That is, k paths are not changed in a predetermined order, but also may be changed to one path randomly selected within a pool of k paths.

In addition, the timing at which k paths are changed may be given as a system parameter, or may be set according to a setting of a user or an operator. Further, the path change timing may be set to a value having a periodicity, or may be determined to be a random point in time.

Alternatively, the path DB may simply transmit k path information to the controller core 111, and the controller core 111 may select a random one for each path change timing from the k paths to set the path.

Accordingly, the controller core 111 can transmit any one of the k paths as path setting instructions or information to the switch according to the path change timing. Such path setting instructions may use, for example, the FlowMod message specified in the Openflow standard.

FIGS. 4A to 4C are diagrams for explaining an example of the overlap check according to the present disclosure.

The examples of FIGS. 4A to 4C assume the number of path candidates, p equals 4 and the number of paths, k equals 1. The four candidate paths are referred to as Path 1, Path 2, Path 3, and Path 4.

Referring to FIG. 4A, all four candidate paths correspond to each path (e.g., the shortest path) for each hypotheses for various network structures, when transmitting a packet from a block (host or switch) index 0 to a block (host or switch) index 12.

For example, Path 1 corresponds to a path through which the packet is transferred in an order of block indexes 0, 1, 3, 9, 11, and 12, Path 2 corresponds to a path in an order of block indexes 0, 1, 4, 8, 10, and 12, Path 3 corresponds to a path through which packets are transferred in an order of block indexes 0, 2, 4, 9, 11, and 12, and Path 4 corresponds to a path through which packets are transferred in an order of block indexes 0, 2, 4, 9, 11, and 12, respectively.

In order to check the redundancy for the candidate path Path 1, it is possible to accumulate a count each time overlap or duplication of a link or a block with other candidate paths Path 2, Path 3 and Path 4 occurs. For example, there exists one in Path 2 as a path overlapping a link of block indexes 0 to 1 based on Path 1, and therefore a value of the link overlap count can be determined to be 1. Since there are no cases in which a link of the block indexes 1 to 3 overlaps any links of any indexes, the overlap count is zero. Since a link of the block indexes 3 to 9 does not overlap any links of any indexes, the overlap count is zero. A link of the block indexes 9 to 11 overlap links in Path 3 and Path 4, so the overlap count is 2. Since a link of the block indexes 11 to 12 overlap with links in Path 3 and Path 4, the overlap count is 2. Accordingly, a result of the overlap check count for Path 1 can be expressed as 1, 0, 0, 2, and 2.

Referring to FIG. 4B, the importance weights may be reflected for the overlap check count values 1, 0, 0, 2 and 2. The weights may be given as a predetermined system parameter according to a nature, a state or the like of the network, or may be set by a user or an operator.

In this example, it is assumed that the weights for the five links included in each candidate path are 2, 4, 6, 4, and 2 in order. Accordingly, 2, 0, 0, 8, and 4 can be obtained by multiplying each of the overlap count values by each of the weights. By adding the count values to which weights are applied in this way, a value of 14 may be computed, and this value can be stored as a total overlap value for the candidate path Path 1.

Next, in order to check the redundancy for the candidate path Path 2, it is possible to accumulate a count each time an overlap or duplication of a link or a block with other candidate paths Paths 1, 3, and 4 occurs. For example, since there exists one in Path 1 for a path overlapping a link of block indexes 0 to 1 based on Path 2, a value of the link overlap count can be determined to be 1. Since a link of the next block indexes 1 to 4 do not overlap any links of any indexes, the overlap count is zero. Since a link of the next block indexes 4 to 8 do not also overlap any links of any indexes, the overlap count is zero. Since the next block indexes 8 to 10 links do not also overlap any links, the overlap count is zero. Since a link of the next block indexes 10 to 12 do not overlap any links, the overlap count is zero. Accordingly, a result of the overlap check counts for Path 2 can be expressed as 1, 0, 0, 0, and 0. When the importance weights (for example, 2, 4, 6, 4, and 2) are also applied to the result, values of 2, 0, 0, 0, and 0 are obtained and a value of 2 obtained by summing these values can be stored as a total overlap value for the candidate path Path 2.

Next, in order to check the redundancy for the candidate path Path 3, it is possible to accumulate a count each time an overlap or duplication of a link or block with other candidate paths Paths 1, 2, 4 occurs. For example, since there exists one in Path 1 for a link overlapping a link of block indexes 0 to 2 based on Path 3, a value of the link overlap count can be determined to be 1. Since there exists one in Path 4 for a link overlapping a link of the next block indexes 2 to 4, a value of the link overlap count can be determined to be 1. Since there exist one in Path 4 for a path overlapping a link of the next block indexes 4 to 9, a value of the link overlap count can be determined to be 1. Since a path overlapping a link of the next block indexes 9 to 11 exists in Path 1 and Path 4, a value of the link overlap count can be determined to be 2. The path overlapping a link from the block indexes 11 to 12 exists in Path 1 and Path 4, and therefore a value of the link overlap count can be determined to be 2. Accordingly, a result of the overlap check count for Path 3 can be expressed as 1, 1, 1, 2, and 2. When the importance weights (for example, 2, 4, 6, 4, and 2) are applied to the result, values of 2, 4, 6, 8 and 4 are obtained and a value of 24 obtained by summing these values can be stored as a total overlap value for the candidate path Path 3.

Next, since the candidate path Path 4 is the same path as the candidate Path 3, the total overlap value for the candidate path Path 4 becomes 24.

Accordingly, Path 2 having the lowest total overlap value among paths Paths 1, 2, 3, and 4 can be determined as a path corresponding to k=1.

If k=2, two candidate paths, Path 2 and Path 1, can be determined as a path corresponding to k=2 in order of low total overlap value.

In the examples of FIGS. 4A to 4C, two steps of overlap check counting and weights applying are performed in order, but may also be performed as one step of accumulatively counting the weights.

In addition, the weights may be determined in accordance with a predefined order in the system, or may be set by a user or an operator. For example, the weights may be set as the same value for all blocks or paths. Further, it may be set to give a larger weight towards the both end points. Further, the weights may be set differently according to the attribute of the switch (e.g., manufacturer, type, version, capacity, etc.).

Figure 5:
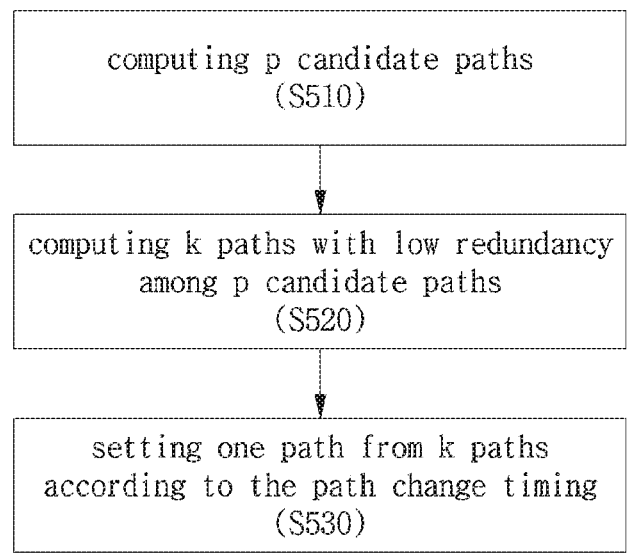
FIG. 5 is a flow chart illustrating an operation of the network device according to the present disclosure.

FIG. 5 is a flow chart illustrating the operation of the network device according to the present disclosure In step S510, the network device can compute p candidate paths from a first host (e.g., data sending side) to a second host (e.g., data receiving side) based on information related to the network structure.

Here, each of the p candidate paths can be computed as a shortest path for each of the cases where different parameter values (or hypotheses) for the network structure are assumed.

Further, the information related to the network structure may include network topology information (e.g., a connection type of blocks constituting the network and parameters related to traffic transfer). Here, the parameters related to the traffic transmission may include the number of hops, link delay cost, or ABR, bandwidth, QoS, delay, and the like.

In step S520, the network device can compute k paths with low redundancy among p candidate paths.

Here, the k paths with low redundancy can be computed in low order by comparing the accumulative values of the overlap counts of the links or blocks among the p candidate paths. Further, the k paths with low redundancy can be computed in low order by comparing the accumulative values to the overlap counts of the links or blocks among the p candidate paths.

In step S530, the network device can set one path from k paths according to the path change timing.

For example, the first path may be selected from k paths at the first point of time of the path change timing, and the second path may be selected at the second point of time. Also, one random path may be selected from k paths for each path change timing In addition, setting one path from k paths may include generating and transmitting a path setting message as a response message to a message requesting to set a path from the first host to the second host. Such a path setting message may be transmitted to all switches belonging to one path determined from k paths.

The network device performing the exemplary operation of FIG. 5 may be performed by a controller in a controller-centralized network structure, a SDN-controller, or an ORR application and related configuration in a controller.

Figure 6:
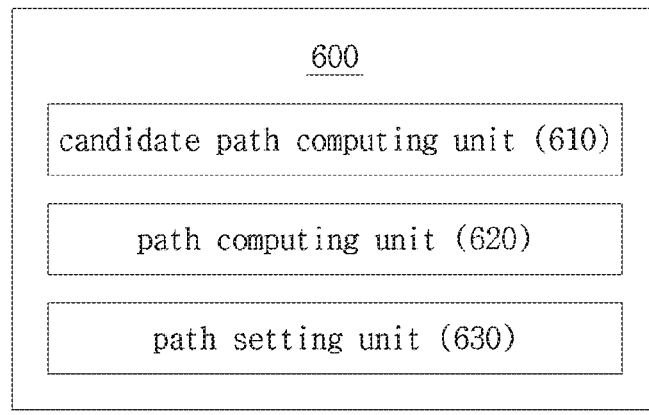
FIG. 6 is a block diagram for explaining a configuration of an overlap-resistant routing apparatus according to the present disclosure.

FIG. 6 is a block diagram for explaining a configuration of the overlap-resistant routing apparatus according to the present disclosure.

The overlap-resistant routing apparatus 600 of FIG. 6 may include a candidate path computing unit 610, a path computing unit 620, and a path setting unit 630.

The candidate path computing unit 610 may compute p candidate paths from a first host (e.g., data sending side) to a second host (e.g., data receiving side) based on information related to a network structure.

Here, each of the p candidate paths may be computed as a shortest path for each of the cases where different parameter values (or hypotheses) for the network structure are assumed.

Further, the information related to the network structure may include network topology information (e.g., a connection type of blocks constituting the network and parameters related to traffic transfer). Here, the parameters related to traffic transfer may include the number of hops, the link delay cost, or ABR, bandwidth, QoS, delay, and the like.

The path computing unit 620 may compute k paths with low redundancy among the p candidate paths.

Here, the k paths with low redundancy can be computed in low order by comparing the accumulative values of the overlap count of links or blocks from the p candidate paths. Also, k paths with low redundancy can be computed in low order by comparing the accumulated values to the overlap counts of links or blocks among the p candidate paths.

The path setting unit 630 can set one path from the k paths according to path change timing.

For example, the first path may be selected from k paths at the first point of time of the path change timing, and the second path may be selected at the second point of time. Also, one random path may be selected from k paths for each path change timing.

In addition, setting one path from k paths may include generating and transmitting a path setting message as a response message to a message requesting to set a path from the first host to the second host. Such path setting message may be transferred to all switches belonging to one path determined from k paths.

The overlap-resistant routing device 600 of FIG. 6 may correspond to some or all of the controllers 110 of FIG. 1.

For example, the candidate path computing unit 610 and the path computing unit 620 may be configured as detailed functional blocks of the ORR application 115 of the controller 110 of FIG. 1, or detailed functional blocks of the controller 110 as a substitute for the ORR application 115, or functional blocks separate from the ORR application 115. Also, the path setting unit 630 may be configured as detailed functional blocks of the controller core 111 of the controller 110 of FIG. 1, or as detailed functional blocks of the topology DB 113, or as functional blocks separate from the controller core 111 or the topology DB 113.

Although the exemplary methods of this disclosure are represented by a series of acts for clarity of explanation, they are not intended to limit the order in which the steps are performed, and if necessary, each step may be performed simultaneously or in a different order. In order to implement the method according to the present disclosure, it is possible to include other steps to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. A case of hardware implementation may be performed by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like.

The scope of the present disclosure is to encompass software or machine-executable instructions (e.g., operating system, applications, firmware, instructions, and the like) by which operations according to method of various embodiments are executed on a device or a computer, and non-transitory computer-readable media executable on the device or the computer, on which such software or instructions are stored.

The invention claimed is:

1. A method of performing an overlap-resistant routing of data in a network, the method comprising:
    computing p candidate paths (p is an integer of 2 or more) for transmitting the data from a first host to a second host in the network based on information related to a structure of the network;
    computing k paths (k is an integer of 1 or more, and k≤p) with low redundancy from the p candidate paths; and
    setting one path from the k paths according to a path change timing;
    wherein each of the p candidate paths is computed as a shortest path for each case in which different parameter values for the network structure are assumed.

2. The method of claim 1, wherein the k paths with low redundancy are determined from the p candidate paths by comparing accumulative values of overlap counts of links or blocks.

3. The method of claim 1, wherein the k paths with low redundancy are determined from the p candidate paths by comparing accumulative values of values obtained by applying weights to overlap counts of links or blocks.

4. The method of claim 1, wherein a first path is selected from the k paths at a first point of time of the path change timing, and a second path is selected from the k paths at a second point of time of the path change timing.

5. The method of claim 1, wherein the one path is determined randomly from the k paths.

6. The method of claim 1, wherein the setting of the one path from the k paths comprises: sending a path setting message in response to a path setting request from the first host to the second host.

7. The method of claim 6, wherein the path setting message is transmitted to one or more switches belonging to the one path.

8. The method of claim 1, wherein the information related to the network structure includes a connection type of blocks constituting a network and parameters related to traffic transfer.

9. The method of claim 8, wherein the parameters related to the traffic transfer include one or more of a number of hops, a link delay cost, an available bandwidth ratio (ABR), a bandwidth, a quality of service (QoS), and a delay.

10. An apparatus for performing an overlap-resistant routing of data in a network, the apparatus comprising:

a candidate path computing unit for computing p candidate paths (p is an integer of 2 or more) for transmitting the data from a first host to a second host in the network based on information related to a structure of the network;

a path computing unit for computing k paths (k is an integer of 1 or more, and k≤p) with low redundancy from the p candidate paths; and a path setting unit for setting one path from the k paths according to a path change timing, wherein each of the p candidate paths is computed as a shortest path for each case in which different parameter values for the network structure are assumed.

11. The apparatus of claim 10, wherein the k paths with low redundancy are determined from the p candidate paths by comparing accumulated values of overlap counts of links or blocks.

12. The apparatus of claim 10, wherein the k paths with low redundancy are determined from the p candidate paths by comparing accumulated values of values obtained by applying weights to overlap counts of links or blocks.

13. The apparatus of claim 10, wherein a first path is selected from the k paths at a first point of time of the path change timing, and a second path is selected from the k paths at a second point of time of the path change timing.

14. The apparatus of claim 10, wherein the one path is determined randomly from the k paths.

15. The apparatus of claim 10, wherein the path setting unit transmits a path setting message in response to a path setting request from the first host to the second host.

16. The apparatus of claim 15, wherein the path setting message is transmitted to one or more switches belonging to the one path.

17. The apparatus of claim 10, wherein the information related to the network structure includes a connection type of blocks constituting a network and parameters related to traffic transfer.

18. The apparatus of claim 17, wherein the parameters related to the traffic transfer include one or more of a number of hops, a link delay cost, an available bandwidth ratio (ABR), a bandwidth, a quality of service (QoS), and a delay.

* * * * *